June 26, 1956
W. L. BAKER
2,752,190
HAND ROD HOOK
Filed Oct. 10, 1952
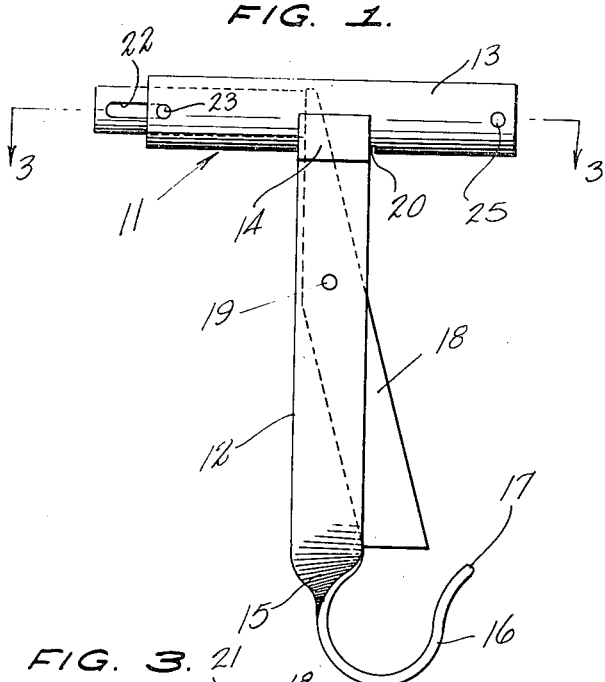
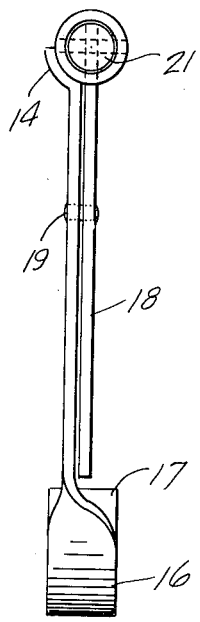
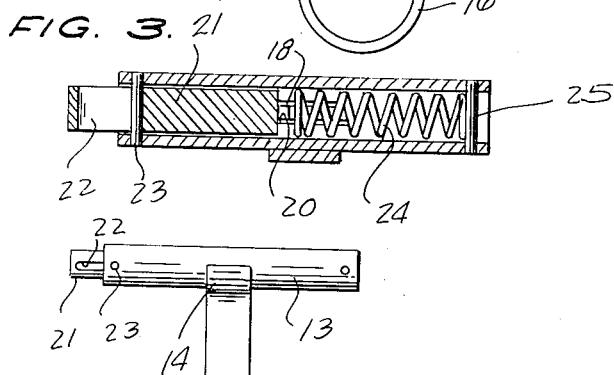
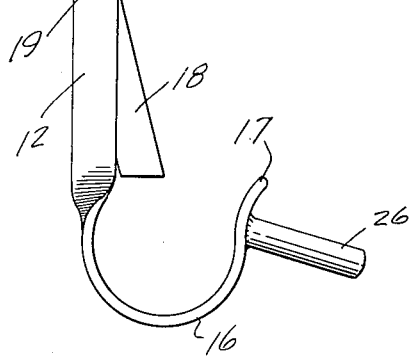
INVENTOR.
WAVY L. BAKER,
BY
McMorrow, Berman & Davidson
ATTORNEYS.

United States Patent Office 2,752,190
Patented June 26, 1956

2,752,190

HAND ROD HOOK

Wavy L. Baker, Plainville, Kans.

Application October 10, 1952, Serial No. 314,126

2 Claims. (Cl. 294—26)

This invention relates to material handling devices, and more particularly to an improved hook device for handling rods, pipes, and similar elongated objects.

A main object of the invention is to provide a novel and improved rod or pipe handling device which is simple in construction, which is compact in size, which is light in weight, and which is especially adapted for use in pulling or moving elongated objects such as rods, pipes, and the like.

A further object of the invention is to provide an improved rod or pipe handling device which is inexpensive to manufacture, which is sturdy in construction, and which provides improved safety in handling pipes, rods, and similar objects, eliminating the necessity for the operator physically handling the pipe or other elongated objects being handled, and thus preventing injury to the operator from contact with harmful chemicals or other material adhering to the objects being handled.

Further objects and advantages of the invention will become apparent from the following description and claims, and from the accompanying drawings, wherein:

Figure 1 is a side elevational view of an improved rod or pipe handling device constructed in accordance with the present invention.

Figure 2 is an end elevational view of the handling device of Figure 1.

Figure 3 is a cross sectional view taken on the line 3—3 of Figure 1.

Figure 4 is a side elevational view of a modified form of rod or pipe handling device constructed in accordance with the present invention.

Referring to the drawings, and more particularly to Figures 1, 2 and 3, 11 generally designates the rod or pipe handling device, said device comprising the elongated flat shank 12 of bar stock whose top end is rigidly secured to the tubular cross bar 13, the top end of the shank 12 being arcuately curved, as shown at 14, and being welded to the intermediate portion of the tubular cross bar 13 and extending at right angles to said cross bar. The shank 12 is twisted at its lower end, as shown at 15, and is formed with the upwardly facing hook 16 having the curved end 17 which is spaced from the twisted portion 15 of shank 12, as shown in Figure 1. Designated at 18 is a latch bar which is pivoted at its intermediate portion, as shown at 19, to the shank 12, the lower end of the latch bar 18 being arranged to extend adjacent the end 17 of hook 16, as shown in Figure 1. The upper portion of latch bar 18 extends through a longitudinal slot formed in the tubular cross bar 13, said slot being shown at 20, in Figures 1 and 3. Rigidly secured to the top end of the latch bar 18 is the plunger 21 which is slidably movable in the left portion of the cross bar 13, as viewed in Figures 1 and 3 and which projects from the left end of the tubular cross bar 13. The plunger 21 is formed at its outer end with the longitudinally extending slot 22 through which extends the transverse pin 23, said pin being rigidly secured in the left end of the tubular cross bar 13 and serving to limit the outward extension of the plunger 21. Designated at 24 is a coiled spring which is positioned in the tubular cross bar 13 and bears at one end against a transverse pin 25 secured in the right end of the cross bar, as shown in Figure 3. The opposite end of the coiled spring 24 bears against the top portion of the shank 18 and biases the plunger 21 to the left, as viewed in Figure 3. This biases the lower portion of the latch member 18 to the position thereof shown in Figure 1, wherein said lower portion extends adjacent the end 17 of the hook 16.

In using the device, the hook 16 is engaged with the object to be moved, such as a pipe or the like, whereby the lower end of the latch bar 18 is moved to the left, as viewed in Figure 1, namely, in a clockwise direction around the pivot pin 19, and then snaps into locking position over the object after the object has been engaged in the hook 16. The object can then be moved, the hook 16 being locked thereto by the latching effect of the bar 18. When it is desired to disengage the hook 16 from the object, the plunger 21 is pushed inwardly, to rotate the latch bar 18 clockwise, as viewed in Figure 1, whereby the hook 16 may be detached from the object.

It will be understood that the operator holds the cross bar 13 in his hand and that the thumb of said hand is available for passing the plunger 21 inwardly, as required. It will be further understood that the bore of the tubular cross bar 13 is sufficiently large to allow free movement of the plunger 21 therein as the latch bar 18 rotates around its pivot pin 19, and that slot 22 is sufficiently wide to prevent pin 23 from binding thereagainst during the rotary movement of said plunger.

Referring now to the modification shown in Figure 4, the hook 16 is provided adjacent the end 17 thereof with the outwardly projecting handle 26 rigidly secured to the hook, said handle 26 serving as a further means for supporting the object being moved, whereby the operator may grasp the cross bar 13 with one hand and the handle 26 with the other hand to lift or move the object engaged in the hook 16.

While certain specific embodiments of an improved rod or pipe handling device have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A rod or pipe handling device comprising a flat shank, a tubular cross bar secured transversely to the top end of the shank with the axis of said cross bar parallel to the plane of the shank, an upwardly facing hook rigidly carried at the lower end of the shank, a latch bar pivoted at its intermediate portion to the intermediate portion of said shank for rotary movement in a plane parallel to the shank, the lower end of the latch bar extending adjacent said hook and the top end of the shank extending into the cross bar, and spring means in said cross bar acting between the cross bar and the top end of said latch bar to bias said latch bar to a position wherein the lower end of the latch bar projects over the hook, said latch bar being rotatable to a position wherein said lower end of the latch bar is substantially flush with the shank.

2. A rod or pipe handling device comprising a flat shank, a tubular cross bar secured transversely to the top end of the shank with the axis of said cross bar parallel to the plane of the shank, an upwardly facing hook rigidly carried at the lower end of the shank, a flat latch bar pivoted to said shank for rotary movement in a plane parallel to the shank, the lower end of said latch bar extending adjacent said hook, the top end of said latch bar extending into said tubular cross bar, a plunger in said tubular cross bar secured to the top end of said latch bar, a coiled spring in said cross bar acting between one end of the cross bar and said plunger, and means limiting outward extension of the plunger from the other end of the cross bar, said coiled spring biasing said latch bar to a position wherein the lower end of the latch bar projects over the hook, said latch bar being rotatable to a position wherein said lower end of the latch bar is substantially flush with the shank.

References Cited in the file of this patent

UNITED STATES PATENTS

| | | |
|---|---|---|
| 1,116,688 | Gaskill | Nov. 10, 1914 |
| 1,582,345 | O'Bannon | Apr. 17, 1926 |
| 1,626,866 | Neilson | May 3, 1927 |
| 2,197,997 | Dee | Apr. 23, 1940 |